Oct. 14, 1947.　　　　　E. R. PRICE　　　　　2,429,196
TRACTOR-TRAILER BRAKING SYSTEM
Filed Aug. 18, 1944　　　2 Sheets-Sheet 1

INVENTOR
EARL R. PRICE
BY T. J. Plante
ATTORNEY

Oct. 14, 1947.  E. R. PRICE  2,429,196
TRACTOR-TRAILER BRAKING SYSTEM
Filed Aug. 18, 1944  2 Sheets-Sheet 2

INVENTOR
EARL R. PRICE
BY
ATTORNEY

Patented Oct. 14, 1947

2,429,196

UNITED STATES PATENT OFFICE 2,429,196

TRACTOR-TRAILER BRAKING SYSTEM

Earl R. Price, South Bend, Ind., assignor to Bendix Aviation Corporation, South Bend, Ind., a corporation of Delaware Application August 18, 1944, Serial No. 549,967

13 Claims. (Cl. 188—3)

This invention relates to tractor-trailer braking systems, and particularly to those parts of such systems which control the relative pressures applying the tractor and trailer brakes.

The usual tractor-trailer brake hookup includes a brake applying device on the trailer, a relay valve for actuating said device, a brake applying device on the tractor, and a control valve for actuating the tractor brake applying device and the relay valve. The relay valve is, of course, used to transmit the "signals" of the tractor control valve to the trailer brakes with a minimum of delay. The relay valve has certain inherent resistances therein which must be overcome before the trailer brake applying device is actuated. These resistances include the resistance of the usual spring which biases the relay valve to released position, and the differential pressure over the poppets in the relay valve, which increases the pressure required to open whichever poppet is closed while the brakes remain released.

The resistance of the relay valve to operation is in series with the resistance of the control valve in the tractor. In other words, before the trailer brake applying device is actuated, the resistances in both the control valve and the relay valve must be overcome, whereas in order to actuate the tractor brake applying device, only the resistance in the control valve must be overcome. Actuation of the tractor brake applying device therefore begins before the relay valve has been opened to begin actuation of the trailer brake applying device. This means that, for a given pressure differential in the usual tractor power device, the corresponding pressure differential in the usual trailer power device will be slightly less, unless means are used to overcome this deficiency. The difference in pressure differentials at the tractor and trailer brakes is particularly noticeable in the early stages of brake application, since the tractor brakes will begin to apply before any pressure differential has been developed at the trailer brakes. This usually causes a jolt as the trailer rides up on the tractor and jars the kingpin. Exactly the reverse occurrence is usually considered desirable or, in other words, it is generally accepted as preferable that the trailer brakes begin to exert a slight dragging effect before the tractor brakes begin to apply.

Heretofore, about the only approach to this problem has been to proportion the control parts of the relay valve in such a way that a given pressure differential at the control valve was the equivalent of a greater pressure differential at the trailer power device. However, while this makes it possible for a slightly less control valve differential to overcome the relay valve resistance, the change is not great enough to have much effect on the ratio between tractor and trailer brakes in their early stages unless the relay valve is made inordinately large. Furthermore, when the relay valve is so proportioned as to make a given control valve pressure differential equivalent to a substantially larger pressure differential at the trailer power device, the result is that the trailer power device attains the maximum pressure differential while the tractor power device has an appreciably lower pressure differential. This is not desirable, since it is generally attempted to have the tractor and trailer brakes "run out," or come to maximum application, in approximate synchronization.

An object of the present invention is to provide means for increasing the pressure differential at the trailer power device above its normal value during the early part of the brake application, without incurring an excessive difference between tractor and trailer pressure differentials during the latter part of the brake application.

A further object is to accomplish the foregoing object by means of a particularly efficient and yet simple mechanism.

A still further object is to provide an improved relay or relay conversion valve structure which will incorporate the additional mechanism necessary to accomplish the first-mentioned object.

Other objects and advantages of the invention will become apparent during the course of the following description, reference being had therein to the accompanying drawings, in which.

Figure 1:
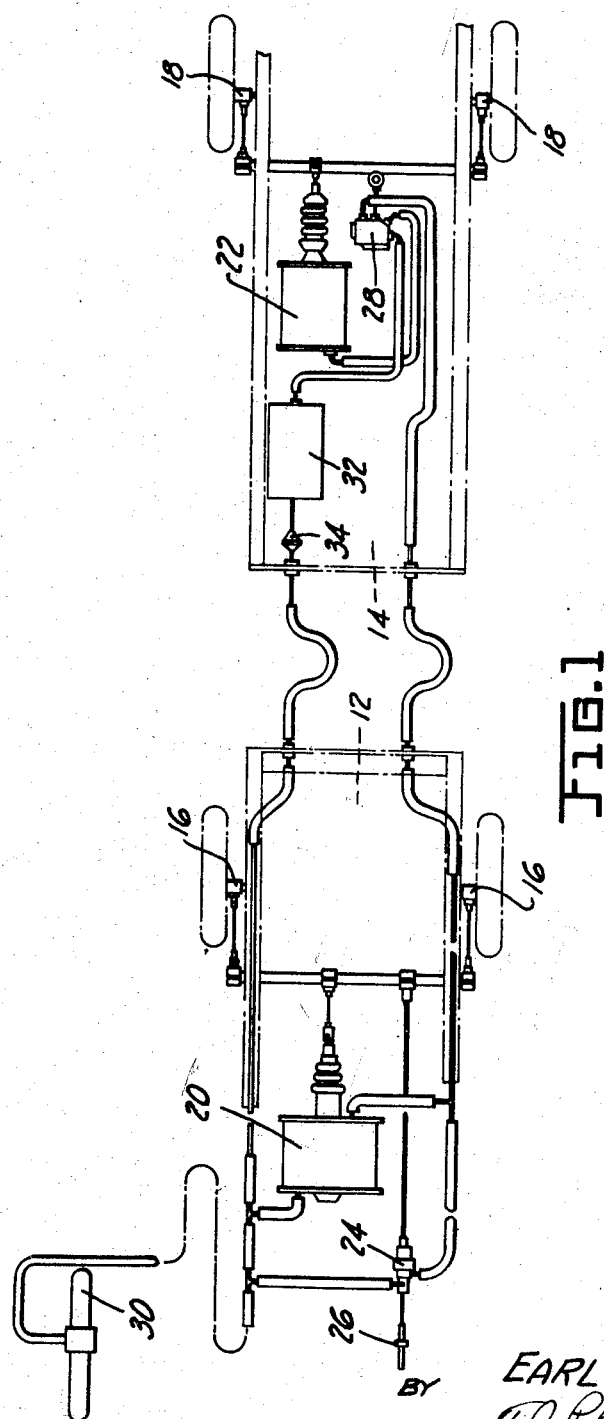
Figure 1 is a diagrammatic showing of a tractor-trailer brake hookup wherein my invention is utilized.

Referring to Figure 1, a tractor is diagrammatically indicated at 12, and a trailer at 14. The tractor is provided with a plurality of brakes 16, two of which are shown in the drawing, and the trailer is provided with a pair of brakes 18. The tractor brakes 16 may be applied by means of a power device 20 and the trailer brakes 18 may be applied by means of a power device 22.

In the conventional tractor-trailer power brake system, the power devices are usually of the differential air pressure type, either compressed air acting against air at atmospheric pressure or air at atmospheric pressure acting against vacuum, the usual vacuum source being the intake manifold. However, the principles of my invention are generally applicable to all tractor-trailer brake arrangements which incorporate a relay valve, regardless of the source of power. For purposes of illustration, I have chosen a conventional tractor-trailer power brake system of the vacuum type. Vacuum cylinders may be of two types, those in which the piston or diaphragm is vacuum submerged while the brakes are released, and those in which the piston or diaphragm is submerged in air at atmospheric pressure while the brakes remain released. In the illustrated system, which shows a conventional hookup, the tractor power cylinder 20 is vacuum suspended, while the trailer power cylinder 22 is atmosphere suspended. It will be obvious that the principles of my invention are not limited to this particular arrangement, since they are equally applicable to any other combination of vacuum suspended and atmosphere suspended power cylinders.

Referring again to Figure 1, a control valve 24 on the tractor may be actuated according to the manipulation of a pedal 26, and this control valve 24 may be connected by means of suitable conduits to relay valve device 28 on the trailer, and to the control chamber of tractor power cylinder 20. Control valve 24 has one port connected to the intake manifold 30 and another port open to atmosphere. One side of the tractor power cylinder 20 is in permanent communication with the vacuum source (intake manifold 30). Preferably a vacuum reserve tank 32 is mounted on the trailer and is connected to the vacuum source, a check valve 34 being provided to prevent the destruction of the reserve tank vacuum due to a temporary destruction of vacuum at the vacuum source or a permanent destruction caused by a break-away. The vacuum reserve tank 32 is connected to one port of relay valve 28, and another port of said valve is connected to one side of trailer power cylinder 22, the other side of said power cylinder being open to atmosphere.

Figure 2:
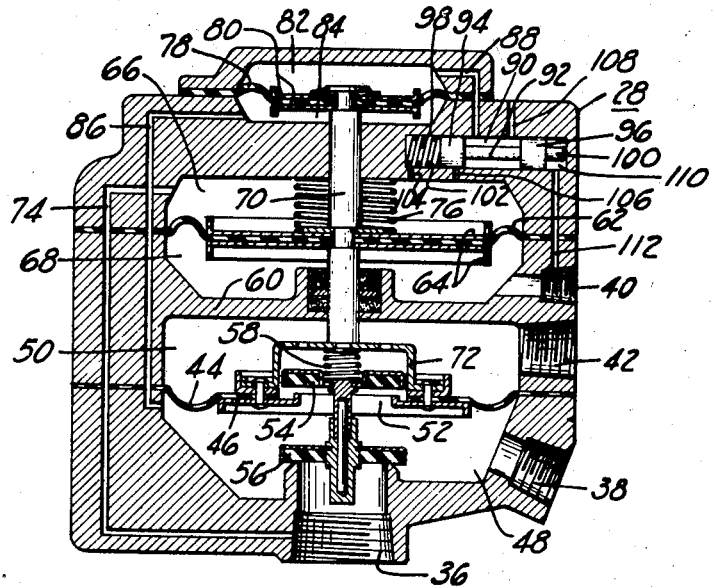
Figure 2 is a section showing the construction of the valve means which is incorporated in Figure 1 to make possible the advantages of my invention, said valve means being shown in the released position.

Referring to Figure 2 for a disclosure of the structure of relay valve 28, the port which is connected to the vacuum reserve tank is shown at 36, the port which is connected to trailer power cylinder 22 is shown at 38, and the port which is connected to control valve 24 is shown at 40. A fourth port 42 is open to atmosphere, preferably through the usual air cleaner.

The valve mechanism shown is usually termed a "relay conversion valve," since it is connected between a control line which is normally (i. e., while the brakes are released) in communication with a source of vacuum, and a trailer power cylinder which is normally submerged in air at atmospheric pressure. The valve structure shown in Figure 2 is adapted to perform the usual relay conversion valve function, plus an additional function which is the primary purpose of the present invention. A pressure responsive member, constituted by a diaphragm 44 and a plate 46 secured thereto, divides the lower portion of the valve body into two chambers 48 and 50. The only port opening into chamber 50 is atmosphere port 42, and therefore chamber 50 at all times contains air at atmospheric pressure. Chamber 48 has three ports, one of which is port 38, connected to the trailer power cylinder. The other two are the atmosphere port 52 and the vacuum port 36, the atmosphere port 52 opening into chamber 50. A pair of interconnected poppets 54 and 56 are arranged to control the ports 52 and 36 respectively. In the position shown, poppet 56 is seated to close vacuum port 36, while poppet 54 remains away from its seat to maintain chamber 48 and the control chamber of trailer power cylinder 22 at atmospheric pressure. A light spring 58 urges poppet 54 toward its seat.

Above the wall 60 at the center of the valve body, another pressure responsive device, constituted by a diaphragm 62 and a pair of plates 64 secured thereto, separates chambers 66 and 68. The assembly comprising diaphragm 62 and plates 64 is clamped to a vertically movable rod 70, which is also secured by means of cup-shaped member 72 to the assembly which comprises diaphragm 44 and plate 46. Thus the two diaphragm assemblies are forced to move upwardly or downwardly together. Chamber 66 is connected by means of a passage 74 with the vacuum port 36, and therefore said chamber 66 is at all times maintained at vacuum pressure. Chamber 68 is connected by means of control port 40 to the conduit which leads to the control valve on the tractor. A spring 76 urges the rod and the two diaphragm assemblies downwardly, and thereby insures the opening of port 52 in released position, poppet 54 being held away from its seat by means of its connection with poppet 56, which is seated. Since the pressure in chamber 48 is atmospheric, while that in port 36 is vacuum, there is a pressure differential acting on the poppet 56 tending to keep it seated.

The system thus far described operates according to conventional principles. When the operator depresses pedal 26, the vacuum port of control valve 24 is closed and the atmosphere port is opened, thus permitting air to move to the control chamber of tractor power cylinder 20, creating a pressure differential over the piston or diaphragm therein. At the same time air passes through the control line to port 40 and chamber 68 of relay valve 28. This creates a pressure differential over diaphragm assembly 62 tending to move it and rod 70 upwardly, thereby first seating poppet 54 to cut chamber 48 off from the atmosphere, and subsequently opening poppet 56 to connect chamber 48 to vacuum. This begins the evacuation of the air at one side of the piston or diaphragm in trailer power cylinder 22, thereby creating a pressure differential over said piston or diaphragm. As the pressure condition in chamber 48 changes from full atmospheric pressure to a pressure somewhat less, a pressure differential is developed over diaphragm assembly 44 tending to move it and therefore rod 70 downwardly. This pressure tends to counteract the pressure over diaphragm assembly 62. When the pressures on the two diaphragm assemblies balance, the valve moves to lapped or holding position, in which both poppets are closed.

When the pressure on control valve 24 is released by the operator, the air in chamber 68 is evacuated, thus permitting the pressure on diaphragm 44 to overcome the pressure on diaphragm 62 and return the poppets 54 and 56 to their initial position, releasing the trailer power cylinder. The power ratio between tractor and trailer power cylinders depends primarily upon the effective areas of the diaphragm assemblies 62 and 44. In other words, if the effective area of one diaphragm is appreciably larger than the other, a lower pressure differential over said larger diaphragm will balance a higher differential over the smaller diaphragm, and consequently the unit pressure differentials acting on the tractor and trailer power cylinders will be unequal. For example, if the maximum pressure differential is based on a vacuum equivalent to 20 inches of mercury, the full 20 inch differential may be present in one power cylinder at the same time that a smaller differential, such as 17 or 18 inches, is present in the other power cylinder. It will be noted that, in the illustrated valve, the effective area of diaphragm 62 is slightly greater than that of diaphragm 44. While the relationship of areas of the diaphragms is, of course, a matter of choice, I prefer the arrangement shown because the difference in effective areas is such as to provide a maximum differential in one power cylinder when there is a maximum differential in the other power cylinder. In other words, the two power cylinders will "run out" or attain full application together. This requires that the areas of the diaphragms be slightly different because of the fact that the relay valve resistance must be overcome. Thus, in the preferred arrangement, at the maximum pressure differential, the force acting on diaphragm 62 is equal to the opposing force acting on diaphragm 44 plus the force of spring 76 and any other resistance inherent in the relay valve structure. The effective area of each diaphragm is determined by adding the area of its control plate and half the area of the portion of the diaphragm between the periphery of the control plate and the casing, diaphragm 62, in the illustration, being provided with control plates 64 which are slightly larger in diameter than the control plate 46 of diaphragm 44.

Due to the pressure of spring 76, and the pressure acting to hold poppet 56 on its seat, there is a resistance to actuation of relay valve 28 which tends to prevent the initial development of a pressure differential at the trailer power cylinder. I have provided means for obtaining a differential at the trailer power cylinder almost as soon as a differential is obtained at the tractor power cylinder, and for increasing the trailer differential above its normal value during the early stages of the brake application. Furthermore, my invention may be utilized to provide an initial pressure differential in the trailer power cylinder slightly greater than the differential in the tractor power cylinder, and to diminish the degree of the "advance" upon further application until the point of valve "run out" is reached, at which point total available pressure differential is present in both tractor and trailer power cylinders. The latter feature is particularly desirable because the effect of the relay valve resistance is much more noticeable when the pressure differentials are low than when they are high. In other words, the additional diaphragm area necessary to counteract the effect of the valve resistance at a low differential is large, whereas, as the pressure differential increases, the required additional diaphragm area decreases, due to the higher working pressures.

Figure 3:
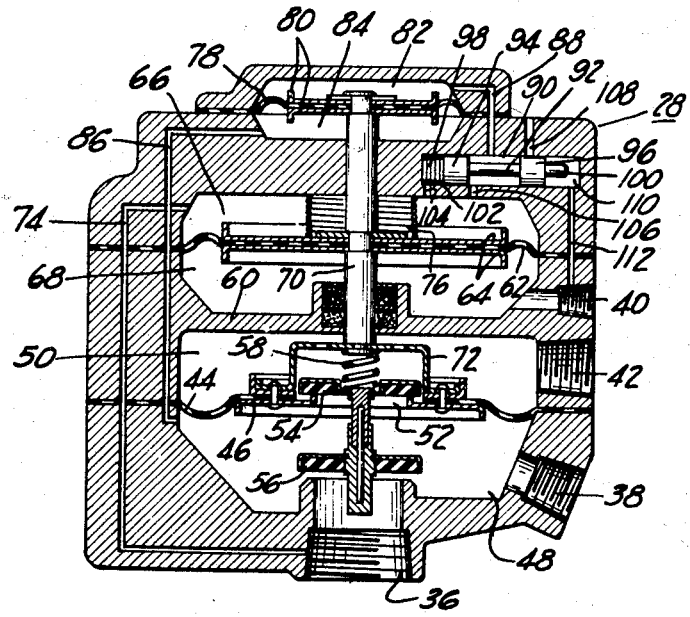
Figure 3 is a section taken through the valve means of Figure 2, showing the same in applied position.

Referring to Figures 2 and 3, an additional pressure responsive member, consisting of diaphragm 78 and plates 80 associated therewith, is secured to rod 70, the diaphragm assembly separating chamber 82 from chamber 84. Chamber 84 is connected by means of passage 86 with chamber 48 of the valve, and therefore the pressure conditions in chamber 84 are the same as those on the control side of the trailer power cylinder. Chamber 82 is connected by means of passage 88 with a bore 90 formed in the valve body. Reciprocable in the bore 90 is a spool valve member having a reduced diameter center portion 92, a valve portion 94, and a pressure responsive portion 96. A spring 98 biases the valve member to released position, in which the projection 100 contacts the end of the bore. Chamber 102 at the left end of the spool valve, which contains spring 98, is connected by means of passage 104 with the constant vacuum chamber 66. Another passage 106 leads from constant vacuum chamber 66 to bore 90, the passage being covered by valve portion 94 in the position shown. A passage 108 leads from the atmosphere to bore 90, and is open when the spool valve is in the position shown, thereby maintaining chamber 82 at atmospheric pressure. The spring 98 is preferably very light, in order that a very slight pressure exerted against portion 96 of the spool valve will compress it and move the valve toward the left. Chamber 110 which is formed at the right end of the spool valve is connected by means of passage 112 to the control port 40.

Operation of the additional structure just described is as follows. When the control valve 24 is actuated to change the pressure conditions in the tractor power cylinder and in chamber 68 of valve 28, this pressure change is communicated also to chamber 110. In other words, as the pressure in the control line builds up above the normal vacuum pressure therein, this increased pressure acts against the spool valve tending to drive it toward the left to the position shown in Figure 3. Since the chamber at the left end of the valve is connected to vacuum chamber 66, the only resistance to movement of the spool valve is that of spring 98. Because this spring is extremely light, almost immediately upon actuation of control valve 24 the increased pressure in chamber 110 will force the spool valve to the left, cutting off passage 108 from passage 88, and connecting passage 106 to passage 88. Thus the air in chamber 82 will be quickly evacuated. Since chamber 102 continues to have a vacuum pressure condition, the spool valve will remain in its left hand position until the pressure in chamber 110 is reduced to its original level.

Evacuation of chamber 82 develops a pressure differential over diaphragm 78 tending to raise rod 70, and thereby adding to the force tending to lift poppet 56 and create a pressure differential in the trailer power cylinder. Since the full differential is immediately effective over diaphragm 78, the total force exerted by the diaphragm depends upon its effective area. This can be given any desired value, depending upon the degree of pressure differential which it is desired to have in the trailer power cylinder during the early stages of brake application. The added force acting on rod 70 due to diaphragm 78 makes it possible to quickly overcome the resistance of spring 76 and poppet 56 in the relay valve, and thereby attain a higher differential at the trailer power cylinder than would otherwise accompany a given tractor differential during the early stages of brake application.

As the differential in the trailer power cylinder increases, and the air in chamber 48 is evacuated, the pressure in chamber 84 will also be reduced, thereby reducing the unit differential pressure over diaphragm 78, and decreasing the effect of said diaphragm 78 upon operation of the relay valve. When full vacuum is developed in chambers 48 and 84, there will be no pressure differential over diaphragm 78, and it will have ceased to effect operation of the relay valve. In other words, the additional diaphragm or pressure responsive member 78 has the maximum effect in the early stages of brake application, and decreases in effectiveness as the brake applying pressures are built up.

This arrangement is ideal because it enables the trailer power cylinder to develop an initial pressure without requiring the build up of a very high pressure differential at the control valve and tractor power cylinder, and yet it permits simultaneous maximum application of both power cylinders. Furthermore, the arrangement is such that a compact and efficient valve mechanism accomplishes the desired results. As a matter of fact, the additional mechanism required may be added to the conventional relay conversion valve in the manner shown, with a minimum of structural changes.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a tractor-trailer braking system having a power device for operating the trailer brakes, a power device for operating the tractor brakes, a relay valve controlling the trailer power device, and a control valve which regulates both the tractor power device and the relay valve, a pressure responsive member operatively associated with the relay valve in such a way that, when said member is moved in one direction, it tends to cause the relay valve to develop a pressure differential in the trailer power device, said member tending to move in the opposite direction as the differential in the trailer power device increases, and a valve element operatively connected to the control valve and movable in response to a very slight pressure change in the control valve to cause a maximum pressure variation over the pressure responsive member moving said member in a direction such that it tends to cause an increase of the trailer differential.

2. Valve means having relay and advance functions comprising a valve element adapted to be moved in one direction to cause a power increase in a controlled motor and in the opposite direction to cause a power decrease in said motor, pressure responsive means associated with said valve element and arranged to tend to move said valve element in the first direction as the pressure in a control line changes from that prevailing during release to that prevailing during actuation and to tend to move the valve element in the other direction as the power in the controlled motor increases, said tendencies being balanced against one another, an additional pressure responsive member also associated with said valve element and arranged to tend to move said valve element in said other direction as the power in the controlled motor increases, a valve member controlled by the pressure in the control line and arranged to create immediately the maximum power at the additional pressure responsive member to tend to move the aforesaid valve element in the first direction whenever the pressure in the control line varies from that prevailing during release.

3. In a vacuum power brake system having a control line and a differential pressure controlled motor, valve mechanism controlling said motor and controlled by said line comprising a first valve member controlling a vacuum port, a second valve member controlling an atmosphere port, a control rod movable in the first direction to first cause closing of the atmosphere port and subsequently cause opening of the vacuum port, and in the second or opposite direction to first cause closing of the vacuum port and subsequently cause opening of the atmosphere port, a pressure responsive movable wall connected to the rod and forming chambers on opposite sides thereof one of which is open to the atmosphere and the other of which is in communication with the controlled motor, the arrangement being such that a decrease of absolute pressure in the chamber which communicates with the controlled motor increases the pressure differential in said motor and also increases the pressure differential over the pressure responsive movable wall urging the control rod in the second direction, a second pressure responsive movable wall connected to the rod and forming chambers on opposite sides thereof one of which is open to a vacuum source and the other of which is in communication with the control line which normally is at vacuum pressure, the arrangement of said second pressure responsive movable wall being such that increases in the absolute pressure of the control line increasingly urge the control rod in the first direction, a third pressure responsive movable wall connected to the rod and forming chambers on opposite sides thereof one of which is open to the pressure prevailing in the controlled motor, and a valve element controlling the pressure in the other chamber formed by the third pressure responsive movable wall, said valve element normally permitting communication of said other chamber with the atmosphere but movable to a position in which evacuation of said other chamber is accomplished, and said valve element being caused by a slight increase of pressure in the control line to move to and remain in the latter position.

4. Valve mechanism for a vacuum power brake system comprising a first valve member controlling a vacuum port, a second valve member controlling an atmosphere port, a control rod movable in the first direction to first cause closing of the atmosphere port and subsequently cause opening of the vacuum port and in the second or opposite direction to first cause closing of the vacuum port and subsequently cause opening of the atmosphere port, a diaphragm connected to the rod and forming chambers on opposite sides thereof one of which is open to the atmosphere and the other of which is in communication with a controlled motor, the arrangement being such that a decrease of absolute pressure in the latter chamber increases the available power in the controlled motor and also increases the pressure differential over the diaphragm urging the control rod in the second direction, a second diaphragm connected to the rod and forming chambers on opposite sides thereof one of which is open to a vacuum source and the other of which is in communication with a control line which normally is at vacuum pressure, the arrangement of said second diaphragm being such that increases in the absolute pressure of the control line increasingly urge the control rod in the first direction, a third diaphragm connected to the rod and forming chambers on opposite sides thereof one of which is open to the pressure prevailing in the chamber which communicates with the controlled motor, and a valve element controlling the pressure in the other chamber formed by the third diaphragm, said valve element normally permitting communication of said other chamber with the atmosphere but movable to a position in which evacuation of said other chamber is accomplished and a pressure differential is thereby developed over said third diaphragm urging the rod in the first direction, and said valve element being caused by a slight increase of pressure in the control line to move to and remain in the latter position.

5. In a relay valve having a valve element and means for operating the valve element in accordance with the relationship between a controlling pressure differential and a controlled pressure differential, means for obtaining a relatively high ratio of controlled pressure differential to controlling pressure differential when the pressures are low comprising a pressure responsive element acting in conjunction with said valve element operating means, and valve means caused by a slight change in the controlling pressure to develop full pressure on the pressure responsive element thereby increasing appreciably the controlled pressure differential.

6. In a relay valve having a valve element and means for operating the valve element in accordance with the relationship between a controlling pressure differential and a controlled pressure differential, means for obtaining a relatively high ratio of controlled pressure differential to controlling pressure differential when the pressures are low comprising a pressure responsive element acting in conjunction with said valve element operating means, and valve means caused by a slight change in the controlling pressure to develop full pressure on the pressure responsive element thereby increasing appreciably the controlled pressure differential, said pressure responsive element being acted on by the controlled pressure to thereafter gradually decrease the effect of said pressure responsive element as the controlled pressure differential increases so that its effect is substantially neutralized when the controlled pressure differential reaches its maximum value.

7. In a relay valve having a valve element and means for operating the valve element in accordance with the relationship between a controlling pressure differential and a controlled pressure differential, in combination, means for obtaining a relatively high ratio of controlled pressure differential to controlling pressure differential when said pressure differentials are low, and means for gradually decreasing said ratio as said pressure differentials increase.

8. In a tractor-trailer braking system having a differential pressure power device for operating the trailer brakes, a differential pressure power device for operating the tractor brakes, a relay valve controlling the trailer power device, a control valve which regulates both the tractor power device and the relay valve, and an operator operated member which actuates the control valve; a pressure responsive member arranged when urged in one direction to cause an increase of the differential in the trailer power device, a valve element automatically operated almost immediately after the operator operated member is actuated to change immediately the pressure on one side of said pressure responsive member and thereby quickly increase the differential in the trailer power device, and a connection between the other side of said pressure responsive member and a pressure which gradually changes as the brake application progresses to substantially neutralize the effect of the pressure responsive member at full power.

9. In a tractor-trailer braking system having a differential pressure power device for operating the trailer brakes, a differential pressure power device for operating the tractor brakes, a relay valve controlling the trailer power device, a control valve which regulates both the tractor power device and the relay valve, and an operator operated member which actuates the control valve; a pressure responsive member normally balanced between substantially equal pressures but arranged when urged in one direction to cause an increase of the differential in the trailer power device, means automatically operated early in the actuation of the operator operated member for changing almost instantaneously the pressure at one side of said pressure responsive member to develop a maximum pressure differential thereover tending to cause an increase of the differential in the trailer power device, and means for gradually changing the pressure at the other side of said pressure responsive member as the brake application progresses to substantially neutralize the effect of the pressure responsive member at full power.

10. Valve means having relay and advance functions comprising a valve member adapted to be moved in one direction to cause a power increase in a controlled motor and in the opposite direction to cause a power decrease in said motor, pressure responsive means associated with said valve member and balanced between the pressure prevailing in a control line and the pressure prevailing in the controlled motor, an additional pressure responsive member also associated with said valve member and normally balanced between substantially equal pressures, a valve element controlling the pressure at one side of said additional pressure responsive member arranged to almost immediately cause development of the maximum pressure differential over said pressure responsive member whenever said valve element is actuated, and means for causing the pressure at the other side of said pressure responsive member to gradually change as the brake application progresses to substantially neutralize the effect of the pressure responsive member at full power.

11. Valve mechanism for a vacuum power brake system comprising a first valve member controlling a vacuum port, a second valve member controlling an atmosphere port, a control rod movable in the first direction to first cause closing of the atmosphere port and subsequently cause opening of the vacuum port and in the second or opposite direction to first cause closing of the vacuum port and subsequently cause opening of the atmosphere port, a diaphragm connected to the rod and forming chambers on opposite sides thereof one of which is open to the atmosphere and the other of which is in communication with a controlled motor, the arrangement being such that a decrease of absolute pressure in the latter chamber increases the available power in the controlled motor and also increases the pressure differential over the diaphragm urging the control rod in the second direction, a second diaphragm connected to the rod and forming chambers on opposite sides thereof one of which is open to a vaccum source and the other of which is in communication with a control line which normally is at vacuum pressure, the arrangement of said second diaphragm being such that increases in the absolute pressure of the control line increasingly urge the control rod in the first direction, a third diaphragm connected to the rod and forming chambers on opposite sides thereof which are normally under substantially the same pressure conditions, a valve element controlling the pressure in one of the chambers formed by said third diaphragm, said valve element being automatically actuated during the initial stage of brake application to cause a rapid and complete change of pressure in the chamber which it controls, and means connecting the other chamber formed by said third diaphragm to a pressure which gradually changes during the brake application until the pressure differential over said third diaphragm is substantially eliminated when full power is reached.

12. In a tractor-trailer braking system having a differential pressure power device for operating the trailer brakes, a differential pressure power device for operating the tractor brakes, a relay valve controlling the trailer power device, a control valve which regulates both the tractor power device and the relay valve, and an operator operated member which actuates the control valve; a pressure responsive member normally balanced between substantially equal pressures but arranged when urged in one direction to cause an increase of the differential in the trailer power device, means automatically operated early in the actuation of the operator operated member for changing almost instantaneously the pressure at one side of said pressure responsive member to develop a maximum pressure differential thereover tending to cause an increase of the differential in the trailer power device, the other side of said pressure responsive member being in communication with a pressure which changes gradually as the brake application progresses until full power is obtained, at which time the effect of the pressure responsive member is substantially neutralized.

13. Valve means having relay and advance functions comprising a valve member adapted to be moved in one direction to cause a power increase in a controlled motor and in the opposite direction to cause a power decrease in said motor, pressure responsive means associated with said valve member and balanced between the pressure prevailing in a control line and the pressure prevailing in the controlled motor, an additional pressure responsive member also associated with said valve member and normally balanced between substantially equal pressures, a valve element controlling the pressure at one side of said additional pressure responsive member arranged to almost immediately cause development of the maximum pressure differential over said pressure responsive member whenever said valve element is actuated, the other side of said pressure responsive member being in communication with a pressure which changes gradually until full power is obtained, at which time the effect of the pressure responsive member is substantially neutralized.

EARL R. PRICE.

REFERENCES CITED

The following references are of record in the file of this patent:

UNITED STATES PATENTS

| Number | Name | Date |
|---|---|---|
| 2,062,500 | Casler et al. | Dec. 1, 1936 |

FOREIGN PATENTS

| Number | Country | Date |
|---|---|---|
| 512,436 | Great Britain | Sept. 15, 1939 |
| 385,163 | Great Britain | Dec. 22, 1932 |